(12) United States Patent
Aoki et al.

(10) Patent No.: US 6,958,852 B2
(45) Date of Patent: Oct. 25, 2005

(54) OPTICAL MODULATOR, METHOD OF ACHIEVING VELOCITY MATCHING AND IMPEDANCE MATCHING OF OPTICAL MODULATOR, AND METHOD OF MANUFACTURING OPTICAL MODULATOR

(75) Inventors: Kenji Aoki, Ogaki (JP); Jungo Kondo, Nishikamo-gun (JP); Atsuo Kondo, Okazaki (JP); Osamu Mitomi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/743,053

(22) Filed: Dec. 23, 2003

(65) Prior Publication Data

US 2004/0145797 A1 Jul. 29, 2004

(30) Foreign Application Priority Data

Jan. 7, 2003 (JP) ............................. 2003-000845

(51) Int. Cl.⁷ ............................. G02B 6/10; G02F 1/29
(52) U.S. Cl. ...................................... 359/315; 359/320
(58) Field of Search ............................. 359/315, 320, 359/321, 322, 323, 237, 238; 385/129, 2, 385/8, 40

(56) References Cited

FOREIGN PATENT DOCUMENTS

| EP | 05093892 | * 4/1993 |
|----|----------|----------|
| JP | A 9-211402 | 8/1997 |

OTHER PUBLICATIONS

Yoneyama et al, "Velocity-Matched . . . Optical Modulator Using Inverted Slot Line", IEEE Microwave and Guided Wave Letters, vol. 1, No. 8, p. 192, Aug. 1991.*

Kawano, "High-Speed Shielded Velocity Matched . . . Optical Modulator", IEEE J. of Quantum Electronics, vol. 29, No. 9, p. 2466, Sep. 1993.*

* cited by examiner

*Primary Examiner*—Scott J. Sugarman
*Assistant Examiner*—Richard Hanig
(74) *Attorney, Agent, or Firm*—Oliff & Berridge, PLC

(57) ABSTRACT

A Mach-Zehnder optical waveguide is disposed in a substrate made of a material having an electro-optic effect. Coplanar-waveguide modulating electrodes are disposed on a principal surface of the substrate. A dielectric layer is disposed on a reverse surface of the substrate. A supporting substrate having a recess is disposed in contact with the dielectric layer such that the recess is located at a position corresponding to a modulating region. The relationship: $\in_r > \in_s$ is satisfied where $\in_r$ represents the dielectric constant of the supporting substrate and $\in_s$ represents the dielectric constant of the dielectric constant of solid, liquid, or gaseous substance in the recess.

16 Claims, 2 Drawing Sheets

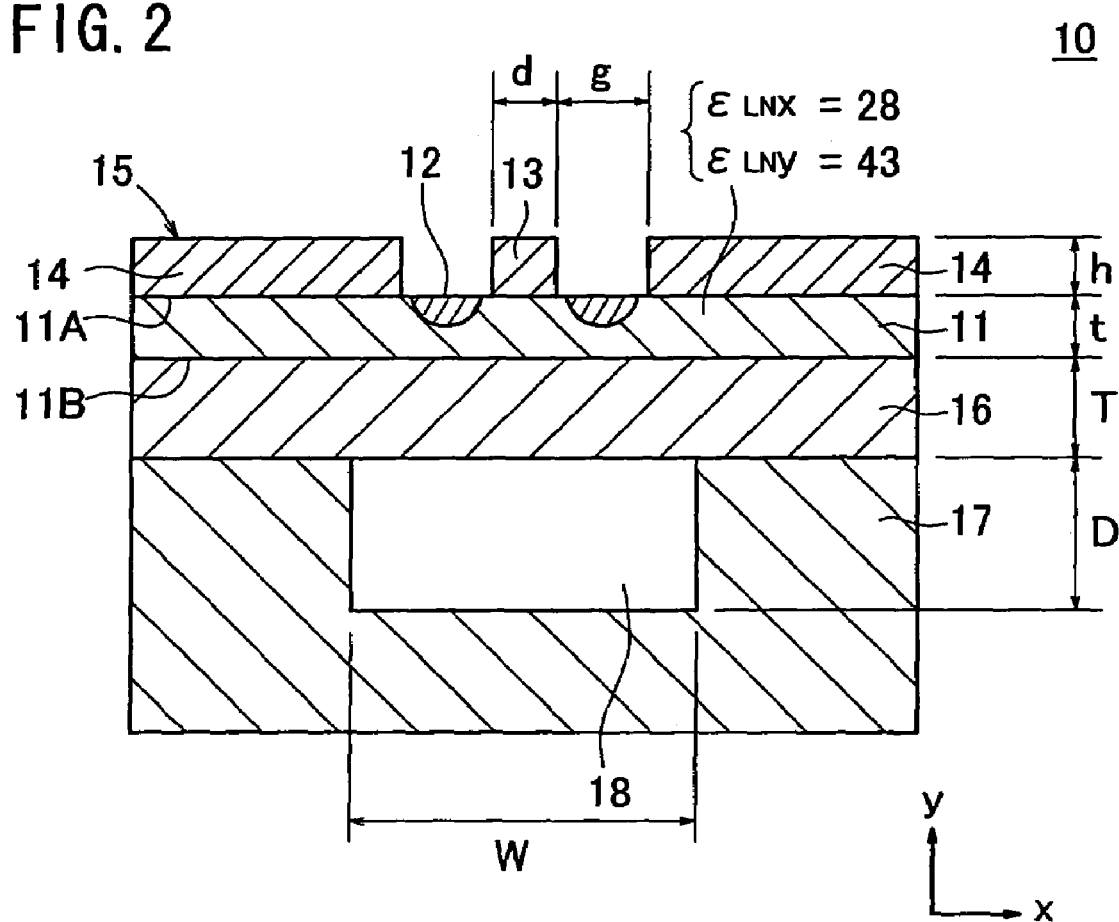

US 6,958,852 B2

OPTICAL MODULATOR, METHOD OF ACHIEVING VELOCITY MATCHING AND IMPEDANCE MATCHING OF OPTICAL MODULATOR, AND METHOD OF MANUFACTURING OPTICAL MODULATOR

BACKGROUND OF THE INVENTION

1. Field of the Invention

The present invention relates to an optical modulator which is suitable for use in a high-speed, broadband optical fiber communication system, a method of achieving velocity matching and impedance matching of such an optical modulator, and a method of manufacturing such an optical modulator.

2. Description of the Related Art

In recent years, with the progress of high-speed, broadband optical fiber communication systems, high-speed optical modulators using optical waveguide devices such as external modulators have been widely used in practical applications. Since such an optical modulator modulates a lightwave guided through an optical waveguide with a modulating signal in a microwave range, for example, it is important for the optical modulator to achieve velocity matching and impedance matching between the lightwave and the modulating signal.

In an attempt to achieve velocity matching and impedance matching, Japanese laid-open patent publication No. 9-211402 discloses an optical modulation device.

According to the disclosure, a supporting substrate is mounted on the reverse surface of a substrate of the optical modulation device. The supporting substrate has a cavity at a position corresponding to a modulating region of the optical modulation device for lowering the effective refractive index of a modulating signal thereby to suppress a reduction in the phase velocity of the modulating signal. Suppressing a reduction in the phase velocity of the modulating signal is effective to achieve velocity matching between a lightwave guided through an optical waveguide of the optical modulation device and the modulating signal that is applied from a modulating electrode of the optical modulation device, thus achieving impedance matching.

According to the above arrangement, the substrate of the optical modulation device needs to be as thin as several $\mu$m for achieving sufficient velocity matching and impedance matching. However, it requires a high level of machining accuracy to produce the thin substrate, and hence it has been difficult to manufacture an optical modulator incorporating the above optical modulation device. The supporting substrate with the cavity is liable to suffer stresses concentrated around the cavity, tending to cause a DC drift and a thermal drift which make it difficult for the optical modulator to operate stably. The stress concentration may destroy the optical modulation device, i.e., the optical modulator undesirably.

SUMMARY OF THE INVENTION

It is an object of the present invention to provide an optical modulator which has sufficient mechanical strength and stability, can achieve velocity matching and impedance matching with ease, and can be manufactured by a simple process.

An optical modulator according to the present invention has:

an optical modulation device having a substrate made of material having an electro-optic effect, an optical waveguide disposed in the substrate, and modulating electrodes disposed on a principal surface of the substrate for applying a modulating signal to a lightwave guided through the optical waveguide;

a dielectric layer having a first surface in contact with a reverse surface of the substrate; and a supporting substrate disposed on a second surface of the dielectric layer and having a recess at a position corresponding to at least a modulating region of the optical modulation device;

wherein the relationship: $\epsilon_r > \epsilon_s$ is satisfied where $\epsilon_r$ represents the dielectric constant of the supporting substrate and $\epsilon_s$ represents the dielectric constant of solid, liquid, or gaseous substance in the recess.

A method of achieving velocity matching and impedance matching of an optical modulator according to the present invention includes the steps of:

preparing an optical modulation device having a substrate made of material having an electro-optic effect and a dielectric constant $\epsilon_{LN}$, an optical waveguide disposed in the substrate, and modulating electrodes disposed on a principal surface of the substrate for applying a modulating signal to a lightwave guided through the optical waveguide;

forming a dielectric layer having a first surface in contact with a reverse surface of the substrate; and forming a supporting substrate disposed on a second surface of the dielectric layer and having a recess at a position corresponding to at least a modulating region of the optical modulation device, wherein the relationship: $\epsilon_r > \epsilon_s$ is satisfied where $\epsilon_r$ represents the dielectric constant of the supporting substrate and $\epsilon_s$ represents the dielectric constant of solid, liquid, or gaseous substance in the recess.

A method of manufacturing an optical modulator according to the present invention includes the steps of:

preparing an optical modulation device having a substrate made of material having an electro-optic effect and a dielectric constant $\epsilon_{LN}$, an optical waveguide disposed in the substrate, and modulating electrodes disposed on a principal surface of the substrate for applying a modulating signal to a light wave guided through the optical waveguide;

forming a dielectric layer having a first surface in contact with a reverse surface of the substrate; and forming a supporting substrate disposed on a second surface of the dielectric layer and having a recess at a position corresponding to at least a modulating region of the optical modulation device, wherein the relationship: $\epsilon_r > \epsilon_s$ is satisfied where $\epsilon_s$ represents the dielectric constant of the supporting substrate and $\epsilon_s$ represents the dielectric constant of solid, liquid, or gaseous substance in the recess.

According to the present invention, the dielectric layer and the supporting substrate are disposed on the reverse surface of the optical modulation device, and the recess whose dielectric constant is smaller than the dielectric constant of the supporting substrate is defined in the supporting substrate, thus providing the optical modulator.

To achieve desired velocity matching and impedance matching of the optical modulator, the thickness of the substrate of the optical modulation device needs to be reduced to lower the effective refractive index of the modulating signal. According to the present invention, since the optical modulator is arranged as described above, the effective refractive index of the modulating signal may be sufficiently lowered because of the low dielectric constant in the recess defined in the supporting substrate even if the substrate is relatively thick.

If the dielectric layer is made of a material having a low dielectric constant, then even if the substrate is thick, the effective refractive index of the modulating signal may be sufficiently lowered. The dielectric layer having the low dielectric constant is effective to reinforce the mechanical strength of the substrate which may be thin.

Therefore, the optical modulator is capable of achieving desired velocity matching and impedance matching while maintaining a sufficient level of mechanical strength and sufficiently suppressing a DC drift and a temperature drift for sufficient stability. The optical modulator can be manufactured by a simple manufacturing process.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a cross-sectional view taken along line II—II of FIG. 1.

DESCRIPTION OF THE PREFERRED EMBODIMENTS

Figure 1:
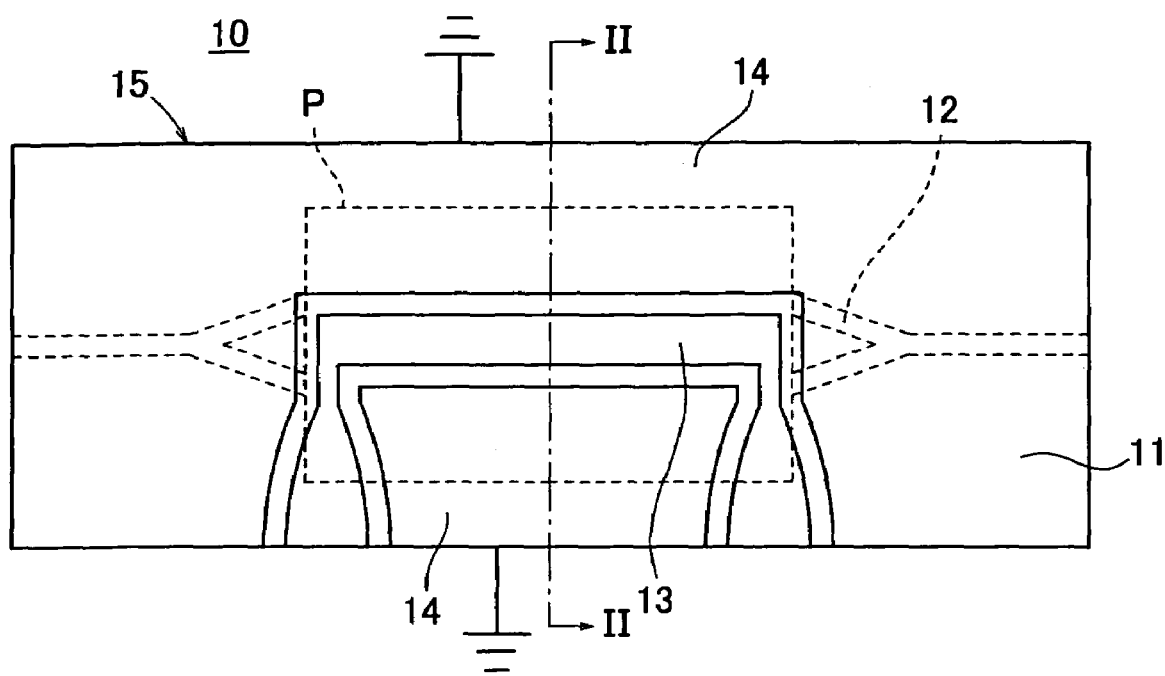
FIG. 1 is a plan view of an optical modulator according to an embodiment of the present invention.

An optical modulator according to an embodiment of the present invention will be described below with reference to FIGS. 1 and 2.

FIG. 1 shows in plan an optical modulator according to the embodiment of the present invention, and FIG. 2 shows the optical modulator in a cross section taken along line II—II of FIG. 1. In FIGS. 1 and 2, various parts of the optical modulator are shown in sizes different from actual sizes for emphasizing the features of the optical modulator according to the embodiment of the present invention.

As shown in FIGS. 1 and 2, the optical modulator 10 according to the present invention has a substrate 11 made of a material having an electro-optic effect, a Mach-Zehnder optical waveguide 12 disposed in the substrate 11 beneath a principal surface 11A thereof, and a signal electrode 13 and ground electrodes 14 which are disposed on the principal surface 11A. The ground electrodes 14 are positioned one on each side of the signal electrode 13. The signal electrode 13 and the ground electrodes 14 serve as coplanar-waveguide (CPW) modulating electrodes. The substrate 11, the optical waveguide 12, and the modulating electrodes (the signal electrode 13 and the ground electrodes 14) jointly make up an optical modulation device 15. The optical modulation device 15 has a modulating region P indicated by the broken lines where a lightwave guided through the optical waveguide 12 and a modulating signal from the modulating electrodes interacts with each other to modulate the lightwave.

A dielectric layer 16 is disposed on the reverse surface 11B of the substrate 11, and a supporting substrate 17 is disposed under the dielectric layer 16. The dielectric layer 16 and the supporting substrate 17 are arranged such that a first surface of the dielectric layer 16 is in contact with the reverse surface 11B of the substrate 11 and the supporting substrate 17 is in contact with a second surface of the dielectric layer 16. The supporting substrate 17 has a recess 18 where the modulating region P is positioned.

If the supporting substrate 17 has a dielectric constant $\in_r$ and a substance in the recess 18 has a dielectric constant $\in_s$, then these dielectric constants satisfy the relationship: $\in_r > \in_s$.

Taking into account the dielectric constant of the substrate 11, the dielectric constant of the dielectric layer 16, the dielectric constant of the substance in the recess 18, the height h and width d of the signal electrode 13, and the gap g between the signal electrode 13 and the ground electrodes 14, the thickness t of the substrate 11, the thickness T of the dielectric layer 16, and the width W and depth D of the recess 18 are changed to achieve velocity matching and impedance matching.

To achieve velocity matching and impedance matching, it is necessary to reduce the thickness of the substrate 11 for lowering the effective refractive index of the modulating signal applied from the modulating electrodes. According to the present embodiment, the recess 18 with its internal space satisfying the above inequality is defined in the supporting substrate 17 that is disposed in a lower portion of the optical modulation device 15. Since the modulating signal leads from the substrate 11 into the recess 18, the dielectric constant of the substance in the recess 18 affects the state in which the modulating signal is propagated. Therefore, the substance in the recess 18 which has the lower dielectric constant can lower the effective refractive index of the modulating signal.

Even if the substrate 11 is relatively thick, the effective refractive index of the modulating signal can be lowered because of the lower dielectric constant of the substance in the recess 18.

The dielectric layer 16 is disposed in contact with the reverse surface 11B of the substrate 11, reinforcing the substrate 11 which may be thin. Furthermore, since the modulating signal leaks out of the substrate 11, the effective refractive index of the modulating signal can be lowered because of a lower dielectric constant of the dielectric layer 16. Accordingly, even if the substrate 11 is relatively thick, the effective refractive index of the modulating signal can be maintained at a sufficiently low level.

Specifically, the structure of the optical modulator 10 shown in FIGS. 1 and 2 is effective to achieve sufficient velocity matching and impedance matching even if the substrate 11 has a thickness of about 30 $\mu$m.

The optical modulator 10 according to the embodiment of the present invention can easily achieve desired velocity matching and impedance matching while maintaining a sufficient level of mechanical strength and sufficiently suppressing a DC drift and a temperature drift for sufficient stability. The optical modulator 10 according to the embodiment of the present invention can also be manufactured by a simple manufacturing process.

As described above, the substrate 11 is made of a material having an electro-optic effect. For example, the substrate 11 is made of lithium niobate, potassium lithium niobate, lithium tantalate, KTP (KTiOPO$_4$), glass, silicon, or quartz crystal. In particular, the substrate 11 should preferably be made of lithium niobate.

The dielectric layer 16 may be made of glass, epoxy resin, or polyimide having a low dielectric constant. Since these materials have a dielectric constant that is sufficiently low compared with the above materials of the substrate 1, they satisfy the inequality referred to above with respect to the dielectric constants, and can provide the advantages described above.

The thickness T of the dielectric layer 16 is not limited to any particular values. However, if the thickness T of the dielectric layer 16 is in the range from 0.1 $\mu$m to 200 $\mu$m, then it can increase velocity matching and impedance matching while maintaining desired mechanical strength and stability of the optical modulator 10.

The dielectric layer 16 needs to be formed on the reverse surface 11B of the substrate 11. However, the dielectric layer 16 may be formed by any of various processes depending on the type of the material that the dielectric layer 16 is made of.

For example, in producing a dielectric layer 16 having a relatively large thickness, a sheet made of one of the above materials is prepared, and applied as the dielectric layer 16 to the reverse surface 11B of the substrate 11. According to this process, the dielectric layer 16 can simply be formed without the need for a complex film forming apparatus.

The internal space of the recess 18 defined in the supporting substrate 17 may be left as an empty cavity or may be filled with a solid, liquid or gaseous substance having a low dielectric constant. If the internal space of the recess 18 is filled with a substance having a low dielectric constant, then the relationship: $\in_{LN} \geq \in_1 > \in_2$ needs to be satisfied where $\in_2$ represents the dielectric constant of the substance filling up the internal space of the recess 18, $\in_{LN}$ represents the dielectric constant of the substrate 11, and $\in_1$ represents the dielectric constant of the dielectric layer 16.

If the internal space of the recess 18 is left as an empty cavity, then it is filled up with air. Therefore, the internal space of the recess 18 has a dielectric constant of about 1, which is sufficiently low.

If the internal space of the recess 18 is filled with a substance having a low dielectric constant other than air, then since the dielectric constant of that substance is usually greater than the dielectric constant of air (=about 1), it is higher than if the internal space of the recess 18 is left as an empty cavity. However, if the internal space of the recess 18 is filled with the substance, then the optical modulator 10 itself has an increased mechanical strength, and hence has sufficient mechanical strength and stability.

The substance having a low dielectric constant may be glass, epoxy resin, or polyimide, for example.

The optical waveguide 12 may be fabricated by a known process such as titanium diffusion or proton exchange. The signal electrode 13 and the ground electrodes 14 may be formed of a material such as gold, silver, copper, or the like by plating and evaporation. Preferably, the supporting substrate 17 is made of a material having a coefficient of linear expansion which is close to the coefficients of linear expansion of the substrate 11 and the dielectric layer 16.

A method of manufacturing the optical modulator 10 according to the present embodiment will be described below by way of inventive example.

First, the substrate 11 was made of an X-cut single crystal of lithium niobate (having a dielectric constant $\in_{LN}$ along the x-axes in FIG. 2 of 28 and along the y-axes of 43, respectively.), and the optical waveguide 12 was formed in the substrate 11 by titanium diffusion. The signal electrode 13 and the ground electrodes 14 were formed on the substrate 11 by plating and evaporation, thus producing the optical modulation device 15. The signal electrode 13 and the ground electrodes 14 had a height h of 20 μm, the signal electrode 13 had a width d of 30 μm, and the signal electrode 13 and the ground electrodes 14 were spaced apart from each other by a gap g of 30 μm.

Then, a sheet of epoxy resin (having a dielectric constant $\in_1 = 3.8$) was applied to the reverse surface 11B of the substrate 11, producing the dielectric layer 16.

Then, the supporting substrate 17 with the recess 18 was made of lithium niobate, and was mounted on the second surface of the dielectric layer 16, thus producing the optical modulator 10. At this time, the supporting substrate 17 was arranged such that the recess 18 is located in the modulating region P of the optical modulation device 15. The recess 18 was left as an empty cavity (having a dielectric constant $\in_s$=about 1).

With the optical modulator 10 thus fabricated, the thickness of the substrate 11 was 10 μm, the thickness of the dielectric layer 16 was 5 μm, the width W of the recess 18 was 500 μm, and the depth D of the recess 18 was 500 μm, thereby achieving desired velocity matching and impedance matching.

An optical modulator according to a comparative example will be described below. The optical modulator according to the comparative example was fabricated in the same manner as with the optical modulator according to the inventive example except that no recess 18 was defined in the supporting substrate 17. The optical modulator according to the comparative example was capable of achieving desired velocity matching and impedance matching when the thickness of the substrate 11 was 0.3 μm and the thickness of the dielectric layer 16 was 5 μm.

As can be seen from the optical modulator 10 according to the inventive example and the optical modulator according to the comparative example, the optical modulator 10 can achieve desired velocity matching and impedance matching even if the substrate 11 has a larger thickness. Stated otherwise, the optical modulator 10 can achieve desired velocity matching and impedance matching while maintaining a sufficient level of mechanical strength and stability. Since the thickness of the substrate 11 is relatively large, it can be machined with relative ease, allowing the optical modulator 10 of the desired structure to be fabricated easily.

The optical modulator 10 according to the above embodiment has the CPW modulating electrodes as described above. However, the optical modulator 10 may employ ACPS modulating electrodes. Elements such as Mg, Zn, Sc, In, etc. may be added to the substrate 11 to increase its resistance to optical damage. Furthermore, buffer layers may be inserted between the substrate 11 and the signal and ground electrodes 13, 14.

Although a certain preferred embodiment of the present invention has been shown and described in detail, it should be understood that various changes and modifications may be made therein without departing from the scope of the appended claims.

What is claimed is:

1. An optical modulator comprising:
   an optical modulation device having a substrate made of material having an electro-optic effect, an optical waveguide disposed in said substrate, and modulating electrodes disposed on said principal surface of the substrate for applying a modulating signal to a lightwave guided through said optical waveguide;
   a dielectric layer having a first surface in contact with a reverse surface of said substrate; and
   a supporting substrate disposed on a second surface of said dielectric layer and having a recess at a position corresponding to at least a modulating region of said optical modulation device;
   wherein the relationship: $\in_r > \in_s$ is satisfied where $\in_r$ represents the dielectric constant of said supporting substrate and $\in_s$ represents the dielectric constant of solid, liquid, or gaseous substance in said recess.

2. An optical modulator according to claim 1, wherein said dielectric layer is in the shape of a sheet.

3. An optical modulator according to claim 1, wherein said dielectric layer is made of a material having a dielectric constant smaller than the material of said substrate.

4. An optical modulator according to claim 1, wherein said substance in said recess has a low dielectric constant, and the relationship: $\in_{LN} > \in_1 > \in_2$ is satisfied where $\in_{LN}$ represents the dielectric constant of said substrate, $\in_1$ represents the dielectric constant of said dielectric layer, and $\in_2$ represents the dielectric constant of said substance in said recess.

5. An optical modulator according to claim 4, wherein said substance in said recess is air.

6. An optical modulator according to claim 1, wherein said substrate is made of lithium niobate.

7. An optical modulator according to claim 1, wherein said substrate has a modulating region, said modulating region or at least a portion of said modulating region having a thickness of at most 30 μm.

8. An optical modulator according to claim 1, wherein the modulating electrodes are in direct contact with the principal surface of the substrate.

9. A method of achieving velocity matching and impedance matching of an optical modulator, comprising the steps of:
   preparing an optical modulation device having a substrate made of material having an electro-optic effect and a dielectric constant $\in_{LN}$, an optical waveguide disposed in said substrate, and modulating electrodes disposed on a principal surface of the substrate for applying a modulating signal to a lightwave guided through said optical waveguide;
   forming a dielectric layer having a first surface in contact with a reverse surface of said substrate; and
   forming a supporting substrate disposed on a second surface of said dielectric layer and having a recess at a position corresponding to at least a modulating region of said optical modulation device, wherein the relationship: $\in_r > \in_s$ is satisfied where $\in_r$ represents the dielectric constant of said supporting substrate and $\in_s$ represents the dielectric constant of solid, liquid, or gaseous substance in said recess.

10. A method according to claim 9, wherein said substance in said recess has a low dielectric constant, and the relationship: $\in_{LN} > \in_1 > \in_2$ is satisfied where $\in_1$ represents the dielectric constant of said dielectric layer, and $\in_2$ represents the dielectric constant of said substance in said recess.

11. A method according to claim 10, wherein said substance in said recess is air.

12. A method according to claim 9, wherein the modulating electrodes are in direct contact with the principal surface of the substrate.

13. A method of manufacturing an optical modulator, comprising the steps of:
   preparing an optical modulation device having a substrate made of material having an electro-optic effect and a dielectric constant $\in_{LN}$, an optical waveguide disposed in said substrate, and modulating electrodes disposed on a principal surface of the substrate for applying a modulating signal to a lightwave guided through said optical waveguide;
   forming a dielectric layer having a first surface in contact with a reverse surface of said substrate; and
   forming a supporting substrate disposed on a second surface of said dielectric layer and having a recess at a position corresponding to at least a modulating region of said optical modulation device, wherein the relationship: $\in_r > \in_s$ is satisfied where $\in_r$ represents the dielectric constant of said supporting substrate and $\in_s$ represents the dielectric constant of solid, liquid, or gaseous substance in said recess.

14. A method according to claim 13, wherein said substance in said recess has a low dielectric constant, and the relationship: $\in_{LN} > \in_1 > \in_2$ is satisfied where $\in_1$ represents the dielectric constant of said dielectric layer, and $\in_2$ represents the dielectric constant of said substance in said recess.

15. A method according to claim 14, wherein said substance in said recess is air.

16. A method according to claim 13, wherein the modulating electrodes are in direct contact with the principal surface of the substrate.

* * * * *